United States Patent
Dulai et al.

(10) Patent No.: US 8,472,372 B1
(45) Date of Patent: Jun. 25, 2013

(54) WIRELESS COMMUNICATION SYSTEM, METHOD, AND COMPUTER PROGRAM PRODUCT

(75) Inventors: Harjinder S. Dulai, Fremont, CA (US); Tommy C. Lee, Danville, CA (US); Chong K. Kuok, Fremont, CA (US)

(73) Assignee: NVIDIA Corporation, Santa Clara, CA (US)

(*) Notice: Subject to any disclaimer, the term of this patent is extended or adjusted under 35 U.S.C. 154(b) by 1008 days.

(21) Appl. No.: 11/695,818

(22) Filed: Apr. 3, 2007

(51) Int. Cl.
*H04W 4/00* (2009.01)
*H04W 7/00* (2006.01)
*G06F 3/12* (2006.01)

(52) U.S. Cl.
USPC .......................... 370/328; 455/517; 358/1.15

(58) Field of Classification Search
USPC .. 370/466, 452, 454, 456, 310, 328; 320/107; 455/404.1, 41, 557, 569.1, 517; 341/51, 50; 358/1.15, 1.13, 1.6
See application file for complete search history.

(56) References Cited

U.S. PATENT DOCUMENTS

| | | | |
|---|---|---|---|
| 5,889,383 A * | 3/1999 | Teich | 320/107 |
| 6,278,697 B1 * | 8/2001 | Brody et al. | 370/310 |
| 7,468,684 B2 * | 12/2008 | Chiu | 341/51 |
| 2002/0094829 A1 * | 7/2002 | Ritter | 455/517 |
| 2003/0083013 A1 * | 5/2003 | Mowery et al. | 455/41 |
| 2006/0268329 A1 * | 11/2006 | Lo | 358/1.15 |
| 2006/0270383 A1 * | 11/2006 | Yergens et al. | 455/404.1 |
| 2008/0268913 A1 * | 10/2008 | Heikkinen | 455/569.1 |

* cited by examiner

*Primary Examiner* — Kent Chang
*Assistant Examiner* — Kuo Woo
(74) *Attorney, Agent, or Firm* — Zilka-Kotab, PC

(57) ABSTRACT

A system, method, and computer program product are provided for transmitting wireless signals to one or more portable devices. In use, a plurality or wireless signals is received utilizing a plurality of protocols. In addition, the plurality of protocols associated with the plurality of wireless signals are converted to a single different protocol. Further, the plurality of wireless signals is transmitted to at least one portable device utilizing the single different protocol.

28 Claims, 6 Drawing Sheets

WIRELESS COMMUNICATION SYSTEM, METHOD, AND COMPUTER PROGRAM PRODUCT

FIELD OF THE INVENTION

The present invention relates to portable devices, and more particularly to wireless communications involving portable devices.

BACKGROUND

Portable devices such as personal digital assistants (PDAs), laptop computers, mobile phones, etc. are traditionally utilized for receiving and transmitting signals wirelessly. For example, PDAs may be utilized for receiving/transmitting Internet content, electronic messages, etc. Such portable devices have conventionally required antennas capable of receiving/transmitting long range signals, as well as power supplies capable of providing significant power resources sufficient to support the communication of such wireless signals.

In one aspect, such conventional antennas and power supplies have considerably increased the physical dimensions of portable devices. In another aspect, quality in the reception of such wireless signals has still been limited based on the positioning of the antenna of the portable device, and many times the positioning of the portable device itself. For example, the portable device is sometimes incapable of receiving/transmitting wireless signals when utilized in a non-optimal location, etc.

There is thus a need for addressing these and/or other issues associated with the prior art.

SUMMARY

A system, method, and computer program product are provided for transmitting wireless signals to one or more portable devices. In use, a plurality or wireless signals is received utilizing a plurality of protocols. In addition, the plurality of protocols associated with the plurality of wireless signals are converted to a single different protocol. Further, the plurality of wireless signals is transmitted to at least one portable device utilizing the single different protocol.

DETAILED DESCRIPTION

Figure 1:
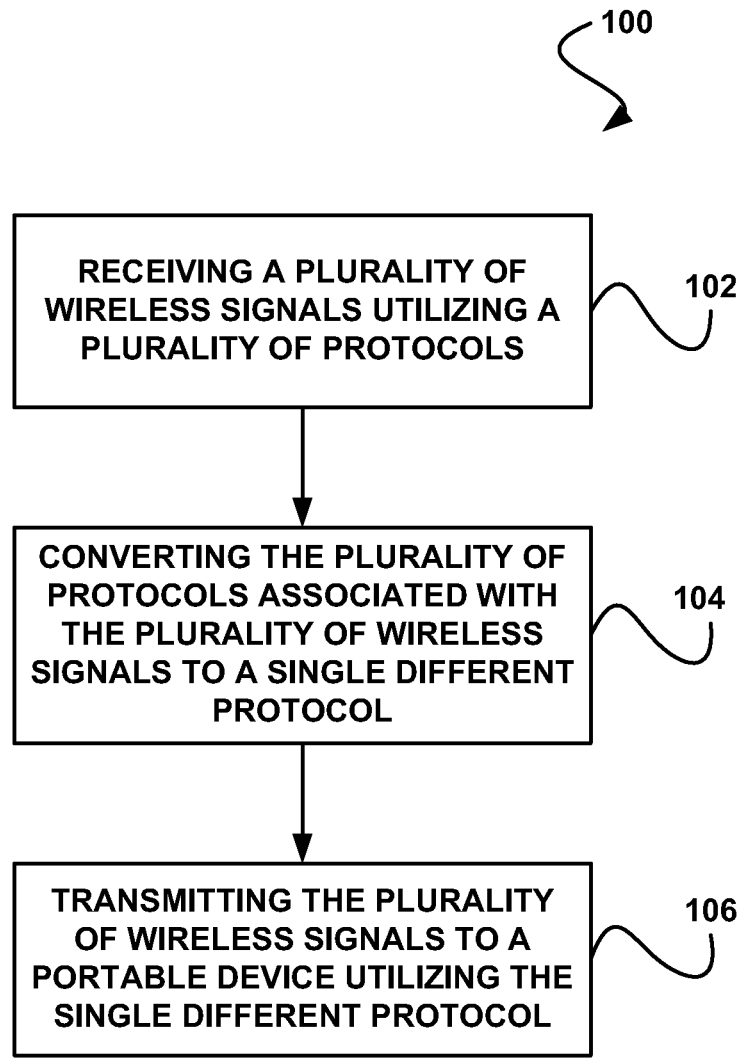
FIG. 1 shows a method for transmitting wireless signals to a portable device, in accordance with one embodiment.

FIG. 1 shows a method 100 for transmitting wireless signals to a portable device, in accordance with one embodiment. As shown, a plurality of wireless signals is received using a plurality of protocols. See operation 102. In the context of the present description, the wireless signals may include any signal capable of being received wirelessly. In various embodiments, the wireless signals may include a digital, analog, etc. signal transmitted over a wireless medium (e.g. wireless network, etc.). Additionally, in various embodiments, the wireless signals may have embodied thereon any type of content including, but not limited to video, audio, data (e.g. for use by applications running on a portable device, a display unit, a car or other device for operating a clock time display, lights, security device, machine operation, etc.), text [e.g. electronic messages (e-mail), web content, etc.], etc.

In the present description, the plurality of protocols refer to any desired protocols capable of being associated with wireless signals. For example, in one embodiment, the protocols may represent different signal formats, etc. In various embodiments, the protocols may include, but are not limited to a global positioning system (GPS) protocol, a digital video broadcasting-handheld (DVB-H) protocol, a digital video broadcasting-terrestrial (DVB-T) protocol, a telecommunication protocol, a 802.11a/b/g protocol, a 3G broadband protocol, an analog and/or digital television protocol, and/or any other signal protocol for that matter. Of course, the protocols may differ in ways other than format, such as in power consumption, range, etc.

Still yet, each of the wireless signals may be received from any desired source capable of transmitting wireless signals. In various embodiments, each wireless signal may be received via a satellite, transmission tower, hub, etc. Of course, the wireless signals may originate from absolutely any device similar to or different from the portable device discussed hereinbelow. To this end, the wireless signals may be received from any number of difference sources.

Furthermore, the protocols associated with the plurality of wireless signals are converted to a single different protocol. See operation 104. The single different protocol may include any protocol that has at least one aspect (e.g. format, power consumption, range, etc.) that is different from the protocols used to receive the wireless signals. In one embodiment, the single different protocol may utilize less power than each of the protocols utilized to receive the wireless signals. For example, the single different protocol may include Bluetooth, a wireless universal serial bus (USB) protocol, etc. Further, it should be noted that the term "single" is to be deemed inclusive of embodiments where the plurality of wireless signals are converted into multiple single protocols (where each instance of the single different protocol correlates to at least two protocols, etc.).

In another embodiment, the single different protocol may be associated with a lower range radio frequency signal than the protocols used to receive the wireless signals. Of course, it should be noted that the single different protocol may be associated with any range of radio frequency signal. In various optional embodiments, Bluetooth may be utilized for lower bandwidth wireless signals, whereas wireless USB may be utilized for higher bandwidth wireless signals.

Strictly as an option, any problems occurring during wireless transmission (e.g. flickering, static, dropped packets, etc.) may optionally be prevented via various procedures including, for example, the use of high bandwidth, error correction, etc. Still yet, the protocols associated with the wireless signals may be converted to the single different protocol in any desired manner. In one embodiment, converting the wireless signals may include demodulating the wireless signals. In another embodiment, converting the wireless signals may include digitizing the wireless signals.

Additionally, the plurality of wireless signals is transmitted to a portable device utilizing the single different protocol. See operation 106. In the context of the present embodiment, the portable device may include any portable device capable of receiving the wireless signals utilizing the single different protocol. Just by way of example, the portable device may include a personal digital assistant (PDA), a mobile phone, a navigation device [e.g. a global positioning system (GPS)], a laptop/palm computer, MPEG-1 Audio Layer 3 (MP3) players, televisions, remote controls, an audio/video player, a car diagnostic device, an emergency assistance device, a driver assistance device, and/or any other device that is portable, for that matter.

Further, the wireless signals may optionally be transmitted to the portable device in any desired manner. For example, in one optional embodiment, the wireless signals may be transmitted to the portable device utilizing multiplexing. Accordingly, the wireless signals may be transmitted to the portable device simultaneously, utilizing the single different protocol.

Of course, it should be noted that the wireless signals may also be transmitted to more than one portable device utilizing the single different protocol. In one embodiment, each of the wireless signals may be transmitted to a different portable device. In another embodiment, the plurality of wireless signals may be transmitted to each of the different portable devices. Thus, the portable devices may receive the same and/or different wireless signals utilizing the single different protocol.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
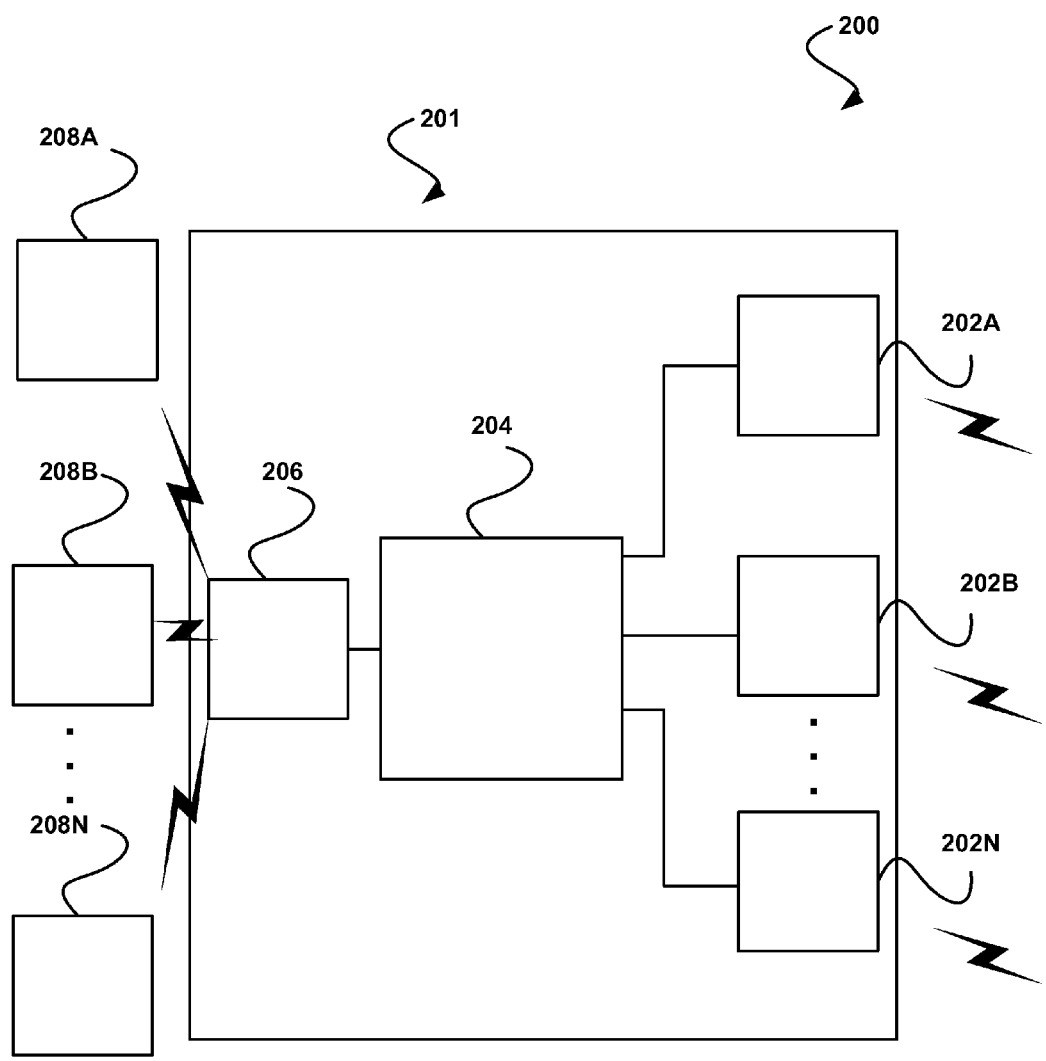
FIG. 2 shows a system for transmitting wireless signals to a portable device, in accordance with another embodiment.

FIG. 2 shows a system 200 for transmitting wireless signals to a portable device, in accordance with another embodiment. As an option, the present system 200 may be implemented to carry out the method 100 of FIG. 1. Of course, however, the system 200 may be implemented in any desired environment. It should also be noted that the aforementioned definitions may apply during the present description.

As illustrated, a base device 201 receives a plurality of wireless signals via one or more modules 202A-N. The modules 202A-N may include, but are not limited to any hardware capable of receiving any type of wireless signal. For example, the modules 202A-N may include digital video broadcast-handheld (DVB-H) and/or a digital video broadcasting-terrestrial (DVB-T) antennas, third generation (3G) antennas, parabolic antennas, GPS antennas, radio frequency antennas (e.g. 802.11 antennas, etc.), infrared (IR) receivers, and associated circuitry (e.g. transceivers, etc.).

As also shown, the modules 202A-N are in communication with a conversion module 204 of the base device 201. To this end, the wireless signals received by the modules 202A-N are transmitted to the conversion module 204. In one optional embodiment, the wireless signals may be transmitted to the conversion module 204 via a plurality of interfaces (not shown). For example, the interfaces may include a DVB-H demodulator, a DVB-T demodulator, a GPS decoder, a modem, an 802.11 transmission interface, etc.

Further, the conversion module 204 converts the received wireless signals to a single different protocol. In the context of the present embodiment, the conversion module 204 may include any device capable of converting the protocols associated with the wireless signals to a single different protocol. For example, the conversion module 204 may include a processor, a multiplexer, etc.

Still yet, the single different protocol may include any desired protocol that is different from the plurality of protocols used by the modules 202A-N to receive the plurality of wireless signals. For example, the single different protocol may be of lower power and/or lower range than the plurality of protocols utilized by the modules 202A-N to receive the plurality of wireless signals. Optionally, other various modules may also be coupled to the conversion module 204, such as, for example, memory for caching, etc. Further, such coupling may occur in any desired manner, e.g. via a bus.

Additionally, the conversion module 204 is in communication with a single protocol module 206 of the base device 201. In one embodiment, the conversion module 204 may be in communication with the single protocol module 206 via an interface (not shown). For example, such interface may include a transmission interface.

Accordingly, the wireless signals associated with the single different protocol are transmitted from the conversion module 204 to the single protocol module 206. The single protocol module 206 may include, but is not limited to any device capable of transmitting the wireless signals associated with the single different protocol to one or more portable devices 208A-N. For example, the single protocol module 206 may include a Bluetooth antenna, a wireless USB antenna, and associated circuitry (e.g. transceivers, etc.). To this end, the single protocol module 206 transmits the plurality of signals to the portable devices 208A-N utilizing the single different protocol.

Optionally, the portable devices 208A-N may only be capable of receiving the wireless signal from the single protocol module 206 if the portable devices 208A-N are set up with the base device 201. For example, such set up may include establishing communication between the base device 201 and the portable devices 208A-N. One example of setting up one of the portable devices 208A-N will be described in more detail below with respect to FIG. 3.

Accordingly, the portable devices 208A-N may optionally utilize the base device 201 to receive low power and/or low range wireless signals which have been converted by the base device 201 from high power and/or high range wireless signals. Thus, by receiving such low power and/or low range wireless signals, a size of the portable devices 208A-N may be reduced (e.g. by reducing a size of an antenna and associated circuitry of the portable devices 208A-N required to receive wireless signals, by reducing a size of a battery required to power the portable devices 208A-N for a particular period of time, etc.). Similarly, a cost associated with manufacturing the portable devices 208A-N may also be reduced.

In various embodiments, the base device 201 may be fixed or portable, and may be powered, charged, and sustained in any manner, e.g. wirelessly. For example, wireless charging may be accomplished in any possible manner, such as, for example, utilizing solar power, radio frequency power, etc. In another embodiment, the base device 201 may also contain rechargeable batteries or other sources of power. Furthermore, the base device 201 may be located in any possible location, including a car or other automobile, on or in apparel, in a building or other structure, on an animal such as a seeing eye dog, etc. Of course, these applications are set forth for illustrative purposes only and should not be construed as limiting in any manner whatsoever.

To this end, the base device 201 may be placed in an optimal area for wireless signal reception, as well as for obtaining power for wireless charging. In one exemplary embodiment, such optimal area may include a windshield of a car. Moreover, the ability to charge wirelessly may optionally eliminate the need for power cables between the base device 201 and a power source.

In addition, the ability to transmit signals wirelessly via the base device 201 to the portable devices 208A-N may eliminate the need for connection cables therebetween. As a result, the base device 201 may be completely wireless, thereby optimizing a portability associated therewith. Additionally, the base device 201 may be universal, in that it may be used with any wireless transmitting and/or receiving devices. While the base device 201 has been described above as integrating the modules 202A-N, the conversion module 204 and the single protocol module 206, it should be noted that any combination of such components may or may not be integrated within the base device 201. To this end, the base device 201 may itself include a plurality of separate devices, each including various modules.

In addition, while the reception of wireless signals at the portable devices 208A-N is described above, it should be noted that the portable devices 208A-N may similarly transmit wireless signals via the base device 201. For example, the portable devices 208A-N may transmit a wireless signal utilizing the single different protocol, described above, to the base device 201. For example, the portable devices 208A-N may transmit the wireless signal to the base device 201 via the single protocol module 206 described above.

The base device 201 may convert the wireless signal received by the portable devices 208A-N to utilize any other desired protocol. For example, the conversion module 204 of the base device 201 described above may optionally be utilized for such conversion. In one embodiment, the other protocol to which the wireless signal is converted may be based on the destination device. In another embodiment, the other protocol may be based on content associated with the wireless signal. In yet another embodiment, the other protocol may be based on an application (e.g. within the portable devices 208A-N) utilized in transmitting the wireless signal.

Thus, the base device 201 may transmit the wireless signal to a destination device utilizing the other protocol. As an option, the base device 201 may transmit the wireless signal to a destination via one of the modules 202A-N described above. The module 202A-N utilized in transmitting the wireless signal may optionally be selected by the base device 201 according to the protocol associated with the wireless signal to be transmitted. To this end, the portable devices 208A-N may send and/or receive wireless signals via the base device 201.

Figure 3:
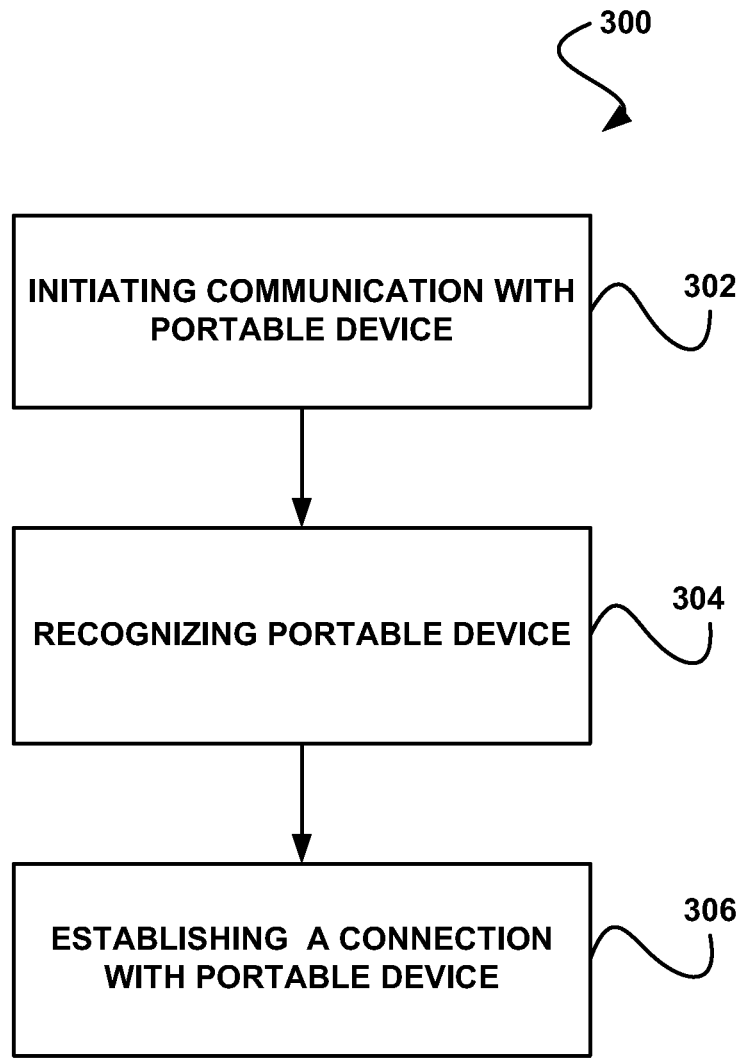
FIG. 3 shows a method for setting up a connection with a portable device, in accordance with yet another embodiment.

FIG. 3 shows a method 300 for setting up a connection with a portable device, in accordance with yet another embodiment. As an option, the present method 300 may be implemented in the context of the functionality and architecture of FIGS. 1-2. Of course, however, the method 300 may be carried out in any desired environment. Again, it should also be noted that the aforementioned definitions may apply during the present description.

As shown, communication with a portable device is initiated. See operation 302. In one embodiment, such communication may include communication between the portable device and a base device. As an option, the base device may include the base device described above with respect to item 201 of FIG. 2.

Also, the communication may be initiated utilizing any desired type of wireless communication. In various embodiments, the communication may be initiated by the portable device or by the base device. In one embodiment, the communication may include "waking up" a dormant device or module, such as the base device or the portable device.

Further, the portable device is recognized, as shown in operation 304. For example, the portable device may be recognized by the base device. The portable device may be recognized by recognizing a unique identifier (e.g. MAC address, serial number, etc.) of the portable device, etc. Of course, however, the portable device may be recognized in any desired manner.

Additionally, a connection is established with the portable device, as shown in operation 306. In one embodiment, the connection may be established between the base device and the portable device. Furthermore, such connection may optionally be established utilizing a predetermined process. For example, such process may include handshaking, linking, etc.

To this end, a portable device may be set up with a connection. For example, a base device may link the portable device with a signal-receiving module of the base device. For example, such signal-receiving module may include an antenna of the base device capable of transmitting signals to and/or receiving signals from the portable device. In one exemplary embodiment, establishing the connection may include the initial waking up and handshaking performed between two Bluetooth devices. Furthermore, the connection may be established utilizing any hardware and/or software.

Figure 4:
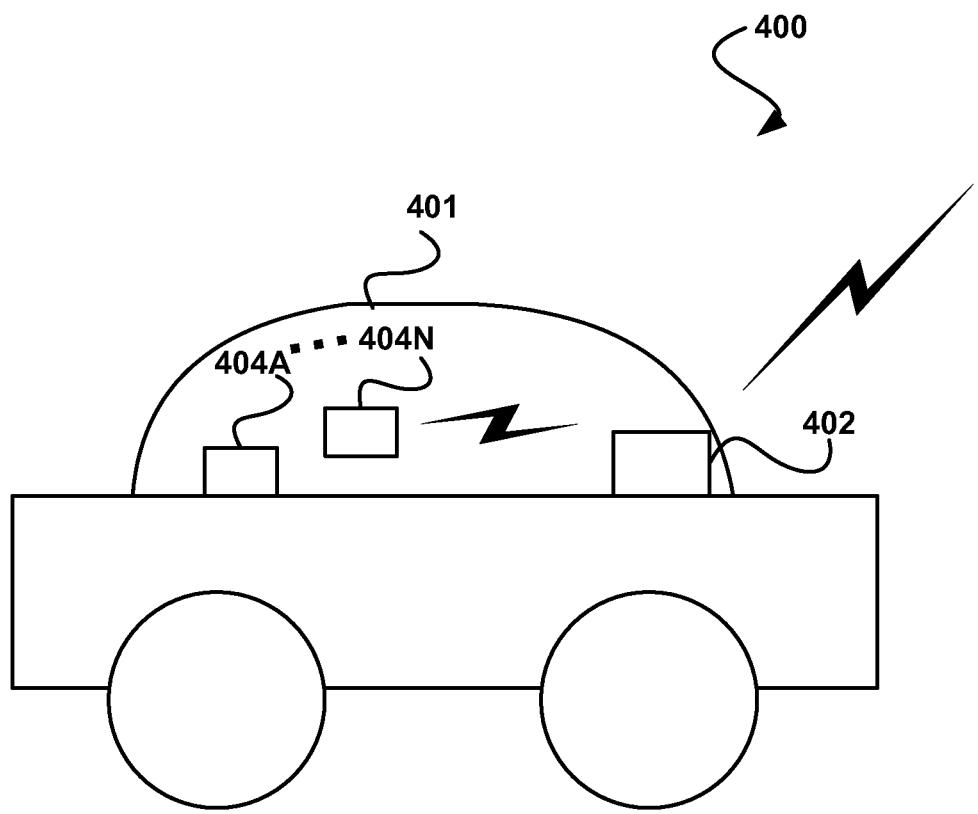
FIG. 4 shows a system for transmitting wireless signals from a base device located in an automobile to a portable device in the automobile, in accordance with still yet another embodiment.

FIG. 4 shows a system 400 for transmitting wireless signals from a base device located in an automobile to a portable device in the automobile, in accordance with still yet another embodiment. As an option, the present system 400 may be implemented in the context of the functionality and architecture of FIGS. 1-3. Of course, however, the system 400 may be implemented in any desired environment.

As illustrated, a base device 402 is coupled to a vehicle 401. The base device 402 may be coupled to any portion of the outside or inside of the vehicle 401. Further, the base device 402 may optionally be coupled to an area where wireless signal reception is favorable, e.g. the dashboard of the vehicle.

Additionally, the base device 402 may be coupled to the vehicle 401 in any desired manner. For example, such coupling may be temporary such that the base device 402 is easily removable from the vehicle 401. Also, the base device 402 may be simply placed on or in the vehicle 401.

In one embodiment, the vehicle 401 may comprise an automobile, but of course may also include any other vehicle used for transportation. As also shown, wireless signals are received by the base device 402 utilizing a plurality of protocols. Such wireless signals are additionally converted by the base device 402 to a single different protocol. The base device 402 then transmits the plurality of wireless signals to one or more portable devices 404A-N utilizing the single different protocol. The portable devices 404 may include any portable devices capable of receiving wireless signals, e.g. navigation devices, mobile phones, portable media players, etc.

To this end, multiple occupants of a vehicle 401 may utilize multiple different portable devices 404A-N that are simultaneously in communication with a single base device 402. Furthermore, the single base device 402 may receive a plurality of wireless signals utilizing one or more protocols, convert the protocols to a single different protocol which optionally utilizes less power than each of the received plurality of protocols, and transmit the plurality of wireless signals to the portable devices 404A-N utilizing the different protocol.

Therefore, various members of a family may be able to talk on a cell phone, utilize a navigation system, listen to streaming music and video, etc. simultaneously utilizing a single base device 402 in a single automobile 401. In another exemplary embodiment, it may be possible for a single base device 402 to act as a wireless, small form-factor "hotspot" which provides various different wireless services (e.g. cellular communications, 802.11 wireless service, etc.) to multiple users in a single location (e.g. a coffee shop, etc.).

Figure 5:
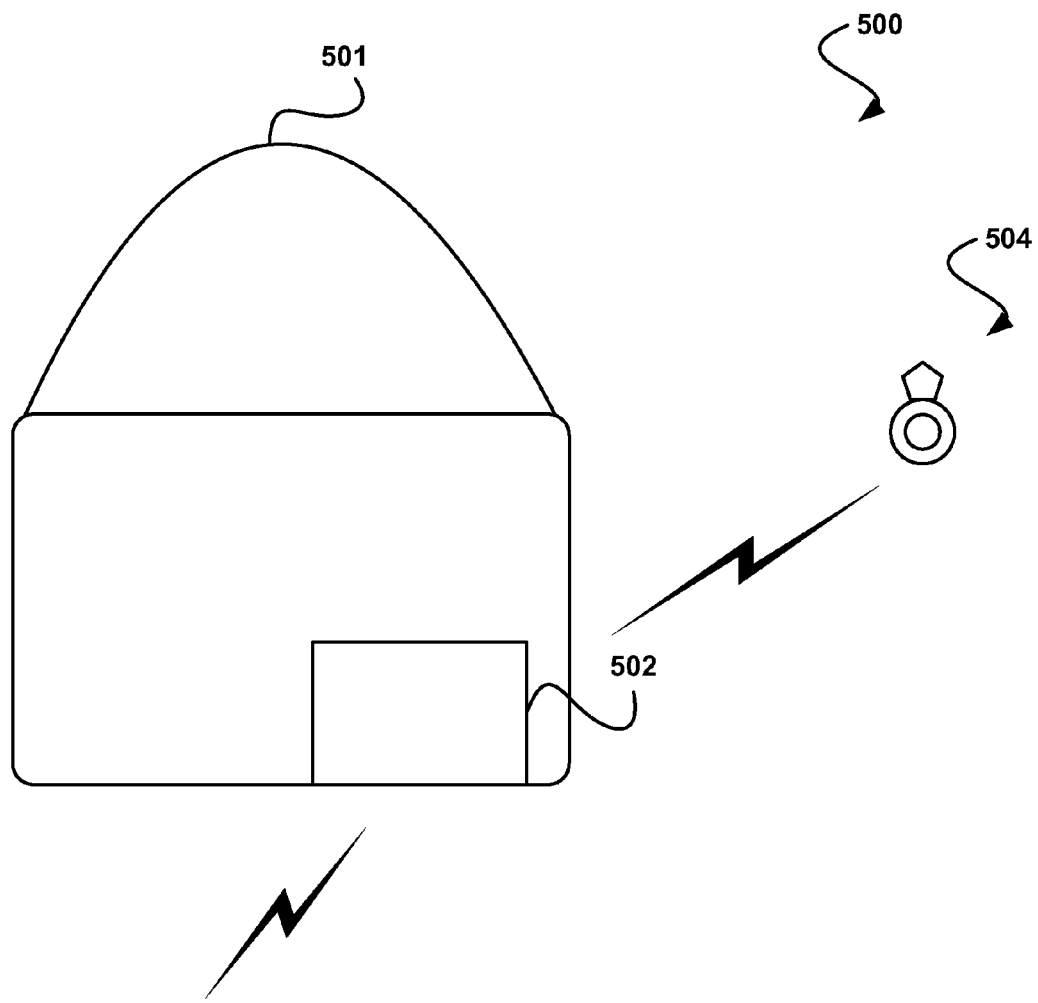
FIG. 5 shows a system for transmitting wireless signals from a base device to a wearable portable device, in accordance with still yet another embodiment.

FIG. 5 shows a system 500 for transmitting wireless signals from a base device to a wearable portable device, in accordance with still yet another embodiment. As an option, the present system 500 may be implemented in the context of the functionality and architecture of FIGS. 1-4. Of course, however, the system 500 may be implemented in any desired environment.

As illustrated, a portable base device 502 may be placed in or coupled to a carrying device 501, such as a purse. While a purse has been shown, it should be noted that the portable base device 502 may be placed in or coupled to any apparel or accessory that may be worn by a user, e.g. a backpack, pocket, belt, etc. As also shown, wireless signals are received by the base device 502 utilizing a plurality of protocols and are converted by the base device 502 to a single different protocol. The base device 502 then transmits the plurality of wireless signals to a portable device 504 utilizing the single different protocol.

The portable device 504 may comprise electronic equipment wearable by a user, such as, for example, a ring containing a GPS locator and display, a watch with a multimedia display, a medical tag with a display, etc. To this end, the base device 502 may receive higher power wireless communications and may utilize large power consumption, whereas the portable device 504 may utilize a smaller amount of power to function and may further receive lower-power signals from the base device 502.

By converting higher power wireless communications to lower power wireless communications at the base device 502, and communicating such lower power wireless communications to the portable device 504, a much smaller and lighter form factor of the portable device 504 may be afforded. Additionally, a user may be able to carry the portable base device 502 while traveling, thus facilitating usability at various locations. Further, a user may be able to utilize a device such as a navigation device while in an automobile, and continue to use the device after exiting the automobile and while walking to a final destination.

Optionally, the portable base device 502 may also be used to receive and transmit wireless signals to one or more similar or different portable devices being used by individuals other than the user carrying the portable base device 502. As a result, more than one user of a similar or different portable device may utilize the portable base device 502 simultaneously, thereby eliminating the need for each user to have a base device 502.

Additionally, due to the possibility of a small form factor and lower power draw for the portable device 504, it may also be possible for the portable device 504 to be implanted within the body (e.g. a GPS locator implanted in the brain, health devices implanted within the body, etc).

Figure 6:
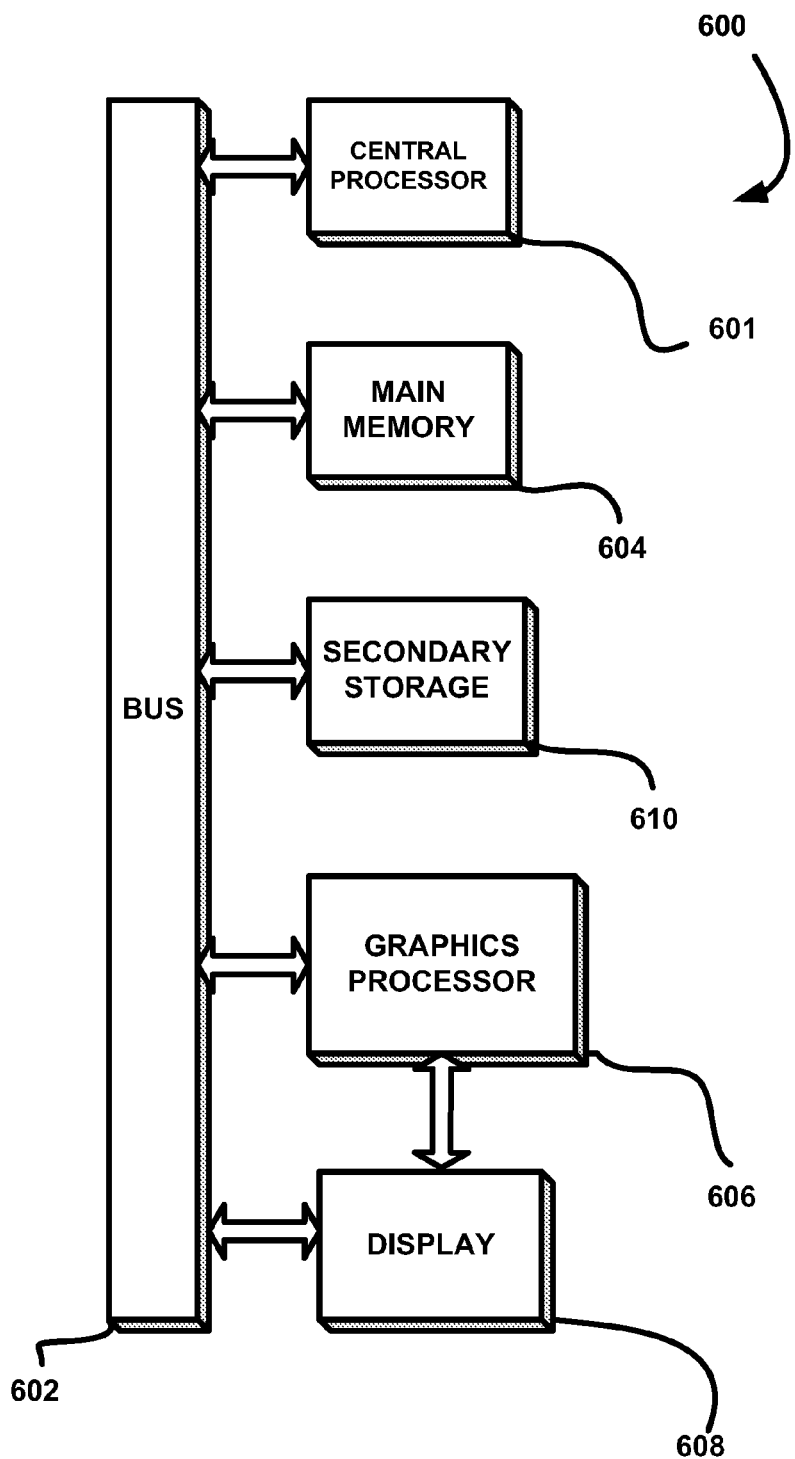
FIG. 6 illustrates an exemplary system in which the various architecture and/or functionality of the various previous embodiments may be implemented.

FIG. 6 illustrates an exemplary system 600 in which the various architecture and/or functionality of the various previous embodiments may be implemented. Specifically, such system 600 may, in various embodiments, represent an exemplary framework for a base device, portable device, and/or any other device mentioned hereinabove.

As shown, a system 600 is provided including at least one host processor 601 which is connected to a communication bus 602. The system 600 also includes a main memory 604. Control logic (software) and data are stored in the main memory 604 which may take the form of random access memory (RAM).

The system 600 also includes a graphics processor 606 and a display 608, i.e. a computer monitor. In one embodiment, the graphics processor 606 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 600 may also include a secondary storage 610. The secondary storage 610 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 604 and/or the secondary storage 610. Such computer programs, when executed, enable the system 600 to perform various functions. Memory 604, storage 610 and/or any other storage are possible examples of computer-readable media.

In one embodiment, the architecture and/or functionality of the various previous figures may be implemented in the context of the host processor 601, graphics processor 606, an integrated circuit (not shown) that is capable of at least a portion of the capabilities of both the host processor 601 and the graphics processor 606, a chipset (i.e. a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 600 may take the form of a desktop computer, lap-top computer, and/or any other type of logic. Still yet, the system 600 may take the form of various other devices m including, but not limited to a personal digital assistant (PDA) device, a mobile phone device, a television, a game device, etc.

Further, while not shown, the system 600 may be coupled to a network [e.g. a telecommunications network, local area network (LAN), wireless network, wide area network (WAN) such as the Internet, peer-to-peer network, cable network, etc.) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   receiving a plurality of wireless signals utilizing a plurality of protocols, the received wireless signals including a first wireless signal including first content intended for delivery to a first uniquely identifiable portable device associated with a first user and a second wireless signal including second content intended for delivery to a second uniquely identifiable portable device associated with a second user;

converting the plurality of protocols associated with the plurality of wireless signals to multiple different protocols, where each instance of the different protocols correlates to at least two of the plurality of protocols; and transmitting the plurality of wireless signals to the first uniquely identifiable portable device associated with the first user and the second uniquely identifiable portable device associated with the second user, utilizing the multiple different protocols;

wherein the plurality of wireless signals transmitted to the first uniquely identifiable portable device and the second uniquely identifiable portable device is multiplexed, for substantially simultaneously sending the first content to the first uniquely identifiable portable device associated with the first user and the second content to the second uniquely identifiable portable device associated with the second user, utilizing the multiple different protocols.

2. The method of claim 1, wherein the content includes at least one of video, audio, text, and data.

3. The method of claim 1, wherein the multiple different protocols utilize less power than each of the plurality of protocols.

4. The method of claim 1, wherein the multiple different protocols include Bluetooth.

5. The method of claim 1, wherein the multiple different protocols include a wireless universal serial bus protocol.

6. The method of claim 1, wherein radio frequencies of the multiple different protocols have a lower range than radio frequencies of each of the plurality of protocols.

7. The method of claim 1, wherein the plurality of wireless signals is received at a base device.

8. The method of claim 7, wherein the base device is portable.

9. The method of claim 7, wherein the base device is wirelessly charged.

10. The method of claim 9, wherein the wireless charging utilizes solar power.

11. The method of claim 9, wherein the wireless charging utilizes radio frequency power.

12. The method of claim 7, wherein the base device is coupled to a car.

13. The method of claim 7, wherein the base device is coupled to apparel.

14. The method of claim 1, wherein each of the uniquely identifiable portable devices includes one of a personal digital assistant, a mobile phone, a navigation device, a laptop computer, a game device, and a watch.

15. The method of claim 1, wherein the converting is performed by a conversion module including a multiplexer.

16. The method of claim 1, further comprising establishing communication with at least one of the uniquely identifiable portable devices.

17. The method of claim 16, wherein establishing the communication with the at least one of the uniquely identifiable portable devices includes "waking up" at least one of the uniquely identifiable portable devices.

18. The method of claim 1, wherein at least one of the uniquely identifiable portable devices is implanted within a body.

19. The method of claim 7, wherein the base device is completely wireless.

20. The method of claim 7, wherein the uniquely identifiable portable devices are only capable of receiving the plurality of wireless signals utilizing the multiple different protocols because the uniquely identifiable portable devices were previously set up with the base device.

21. The method of claim 7, wherein the base device receives wireless signals transmitted from at least one of the uniquely identifiable portable devices utilizing the multiple different protocols, and converts the wireless signals transmitted from the at least one of the uniquely identifiable portable devices into another protocol.

22. The method of claim 21, wherein the other protocol to which the wireless signals transmitted from the at least one of the uniquely identifiable portable devices is converted is based on a destination device.

23. The method of claim 21, wherein the other protocol to which the wireless signals transmitted from the at least one of the uniquely identifiable portable devices is converted is based on a content associated with the wireless signals transmitted from the at least one of the uniquely identifiable portable devices.

24. The method of claim 17, wherein the at least one of the uniquely identifiable portable devices are dormant before being "woken up".

25. The method of claim 16, wherein establishing communication with the at least one uniquely identifiable portable devices includes establishing a connection utilizing one of handshaking and linking.

26. A computer program product embodied on a non-transitory computer readable medium, comprising:

code for receiving a plurality of wireless signals utilizing a plurality of protocols, the received wireless signals including a first wireless signal including first content intended for delivery to a first uniquely identifiable portable device associated with a first user and a second wireless signal including second content intended for delivery to a second uniquely identifiable portable device associated with a second user;

code for converting the plurality of protocols associated with the plurality of wireless signals to multiple different protocols, where each instance of the different protocols correlates to at least two of the plurality of protocols; and code for transmitting the plurality of wireless signals to the first uniquely identifiable portable device associated with the first user and the second uniquely identifiable portable device associated with the second user, utilizing the multiple different protocols;

wherein the computer program product is operable such that the plurality of wireless signals transmitted to the first uniquely identifiable portable device and the second uniquely identifiable portable device is multiplexed, for substantially simultaneously sending the first content to the first uniquely identifiable portable device associated with the first user and the second content to the second uniquely identifiable portable device associated with the second user, utilizing the multiple different protocols.

27. A system, comprising:

a base device for:

receiving a plurality of wireless signals utilizing a plurality of protocols, the received wireless signals including a first wireless signal including first content intended for delivery to a first uniquely identifiable portable device associated with a first user and a second wireless signal including second content intended for delivery to a second uniquely identifiable portable device associated with a second user, converting the plurality of protocols associated with the plurality of wireless signals to multiple different protocols, where each instance of the different protocols correlates to at least two of the plurality of protocols, and transmitting the plurality of wireless signals to the first uniquely identifiable portable device associated with the first user and the second uniquely identifiable portable device associated with the second user, utilizing the multiple different protocols;

wherein the system is operable such that the plurality of wireless signals transmitted to the first uniquely identifiable portable device and the second uniquely identifiable portable device is multiplexed, for substantially simultaneously sending the first content to the first uniquely identifiable portable device associated with the first user and the second content to the second uniquely identifiable portable device associated with the second user, utilizing the multiple different protocols.

28. The system of claim 27, further comprising an object to which the base device is attached.

* * * * *